United States Patent
Yanase et al.

(10) Patent No.: US 8,836,993 B2
(45) Date of Patent: Sep. 16, 2014

(54) IMAGE FORMING APPARATUS AND IMAGE FORMING METHOD

(71) Applicants: Norikazu Yanase, Kanagawa (JP); Kazuyoshi Matsumoto, Tokyo (JP); Makoto Kikura, Kanagawa (JP); Kazuyoshi Kondo, Tokyo (JP); Yuuzoh Obata, Tokyo (JP); Yoshinori Uchino, Kanagawa (JP); Gaku Hosono, Kanagawa (JP)

(72) Inventors: Norikazu Yanase, Kanagawa (JP); Kazuyoshi Matsumoto, Tokyo (JP); Makoto Kikura, Kanagawa (JP); Kazuyoshi Kondo, Tokyo (JP); Yuuzoh Obata, Tokyo (JP); Yoshinori Uchino, Kanagawa (JP); Gaku Hosono, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/950,867

(22) Filed: Jul. 25, 2013

(65) Prior Publication Data
US 2014/0029023 A1 Jan. 30, 2014

(30) Foreign Application Priority Data
Jul. 27, 2012 (JP) .................................. 2012-167768

(51) Int. Cl.
*G06F 15/00* (2006.01)
*G06K 1/00* (2006.01)
*G06K 15/02* (2006.01)
*G06K 15/16* (2006.01)

(52) U.S. Cl.
CPC .............. *G06K 15/024* (2013.01); *G06K 15/16* (2013.01)
USPC ............................................ 358/1.6; 358/1.1

(58) Field of Classification Search
CPC ............................. G06K 15/024; G06K 15/16
USPC ..................................................... 358/1.1, 1.6
See application file for complete search history.

(56) References Cited

U.S. PATENT DOCUMENTS

| 5,940,107 A | 8/1999 | Fox |
| 7,300,129 B2 * | 11/2007 | Kumamoto et al. ............ 347/16 |

(Continued)

FOREIGN PATENT DOCUMENTS

| JP | 62-079154 | 4/1987 |
| JP | 09-141956 | 6/1997 |

(Continued)

OTHER PUBLICATIONS

European Search Report dated Dec. 16, 2013 in corresponding European patent application No. 13 17 7844.1.

*Primary Examiner* — Douglas Tran
(74) *Attorney, Agent, or Firm* — Cooper & Dunham LLP

(57) ABSTRACT

An image forming apparatus includes a recording unit, a conveyance unit, a protection member, and at least one rotor pair. The recording unit forms an image on a print medium having an adhesive face. The conveyance unit conveys the print medium. The protection member presses against the adhesive face of the print medium to protect the adhesive face. Each of the at least one rotor pair includes rotors to sandwich and press the print medium and the protection member therebetween. The conveyance unit is configured to rotate the at least one rotor pair to convey the print medium and the protection member together to an image forming position at which the recording unit is configured to form the image on the print medium. The protection member is configured to separate from the adhesive face before discharge of the print medium to an outside of the image forming apparatus.

10 Claims, 14 Drawing Sheets

(56) References Cited

U.S. PATENT DOCUMENTS

| | | |
|---|---|---|
| 2002/0054781 A1 | 5/2002 | Korem |
| 2006/0001729 A1 | 1/2006 | Inana |
| 2007/0092665 A1 | 4/2007 | Matsubayashi et al. |
| 2008/0316279 A1 | 12/2008 | Takemoto et al. |
| 2011/0220291 A1 | 9/2011 | Roth et al. |
| 2011/0273511 A1 | 11/2011 | Yanase et al. |
| 2011/0279499 A1 | 11/2011 | Kemma et al. |
| 2012/0182347 A1 | 7/2012 | Shimizu et al. |
| 2012/0195652 A1* | 8/2012 | Takahashi et al. ............ 399/323 |
| 2012/0206552 A1 | 8/2012 | Uchino |
| 2012/0293583 A1 | 11/2012 | Kemma et al. |
| 2012/0320127 A1 | 12/2012 | Kikura et al. |
| 2013/0003121 A1 | 1/2013 | Matsumoto et al. |
| 2013/0113861 A1 | 5/2013 | Kikura et al. |
| 2013/0113862 A1 | 5/2013 | Kemma et al. |

FOREIGN PATENT DOCUMENTS

| | | |
|---|---|---|
| JP | 10-139239 | 5/1998 |
| JP | 11-278723 | 10/1999 |
| JP | 2000-246982 | 9/2000 |
| JP | 2002-284131 | 10/2002 |
| JP | 2004-82532 | 3/2004 |
| JP | 2006-224583 | 8/2006 |
| JP | 2009-160769 | 7/2009 |
| JP | 2010-284826 | 12/2010 |
| WO | WO2005/040297 A1 | 5/2005 |
| WO | WO2011/077375 | 6/2011 |

* cited by examiner

IMAGE FORMING APPARATUS AND IMAGE FORMING METHOD

CROSS-REFERENCE TO RELATED APPLICATIONS

This patent application is based on and claims priority pursuant to 35 U.S.C. §119 to Japanese Patent Application No. 2012-167768, filed on Jul. 27, 2012, in the Japan Patent Office, the entire disclosure of which is hereby incorporated by reference herein.

BACKGROUND

1. Technical Field

This disclosure relates to an image forming apparatus and an image forming method, and more specifically to an image forming apparatus and method of forming an image on a print medium having an adhesive face.

2. Description of the Related Art

Image forming apparatuses are used as printers, facsimile machines, copiers, plotters, or multi-functional devices having, e.g., two or more of the foregoing capabilities. As one type of image forming apparatuses, an image forming apparatus is known that prints a print medium having an adhesive face, such as a label sheet having no tape or base sheet.

For example, JP-2002-284131-A proposes an image forming apparatus including a supply roll of a continuous body of labels, a printing unit, ad a separating roller. The supply roll has a winding core wound with a continuous body of labels having no base sheet. The printing unit prints the continuous body of labels while drawing out the continuous body of labels from the supply roll. The separating roller is disposed higher than a winding core and near the supply roll to guide the continuous body of labels to the printing unit by way of the separating roller.

As described above, when an image is formed on a print medium having an adhesive face on which no separation sheet is adhered (hereinafter, also referred to as "linerless label sheet"), such as a label sheet having no tape or base sheet, the inventors have recognized that the adhesive face may adhere to a conveyance passage along which the print medium is conveyed, thus resulting in a non-conveyable state. Alternatively, such a linerless label sheet may receive an increased conveyance resistance, thus resulting in an unstable conveyance and hampering desired image formation.

BRIEF SUMMARY

In at least one exemplary embodiment of this disclosure, there is provided an image forming apparatus including a recording unit, a conveyance unit, a protection member, and at least one rotor pair. The recording unit forms an image on a print medium having an adhesive face. The conveyance unit conveys the print medium. The protection member presses against the adhesive face of the print medium to protect the adhesive face. Each of the at least one rotor pair includes rotors to sandwich and press the print medium and the protection member therebetween. The conveyance unit is configured to rotate the at least one rotor pair to convey the print medium and the protection member together to an image forming position at which the recording unit is configured to form the image on the print medium. The protection member is configured to separate from the adhesive face of the print medium before discharge of the print medium to an outside of the image forming apparatus.

In at least one exemplary embodiment of this disclosure, there is provided an image forming apparatus including recording means, conveyance means, a protection member, and at least one rotor pair. The recording means forms an image on a print medium having an adhesive face. The conveyance means conveys the print medium. The protection member presses against the adhesive face of the print medium to protect the adhesive face. Each of the at least one rotor pair includes rotors to sandwich and press the print medium and the protection member therebetween. The conveyance means rotates the at least one rotor pair to convey the print medium and the protection member together to an image forming position at which the recording means forms the image on the print medium. The protection member is configured to separate from the adhesive face of the print medium before discharge of the print medium to an outside of the image forming apparatus.

In at least one exemplary embodiment of this disclosure, there is provided a method of forming an image on a print medium having an adhesive face. The method includes pressing, conveying, forming, and separating. The pressing presses a protection member against the adhesive face. The protection member is separable from the adhesive face. The conveying conveys the print medium and the protection member together while sandwiching the print medium and the protection member. The forming forms an image on the print medium conveyed by the conveying. The separating separates the print medium from the protection member.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
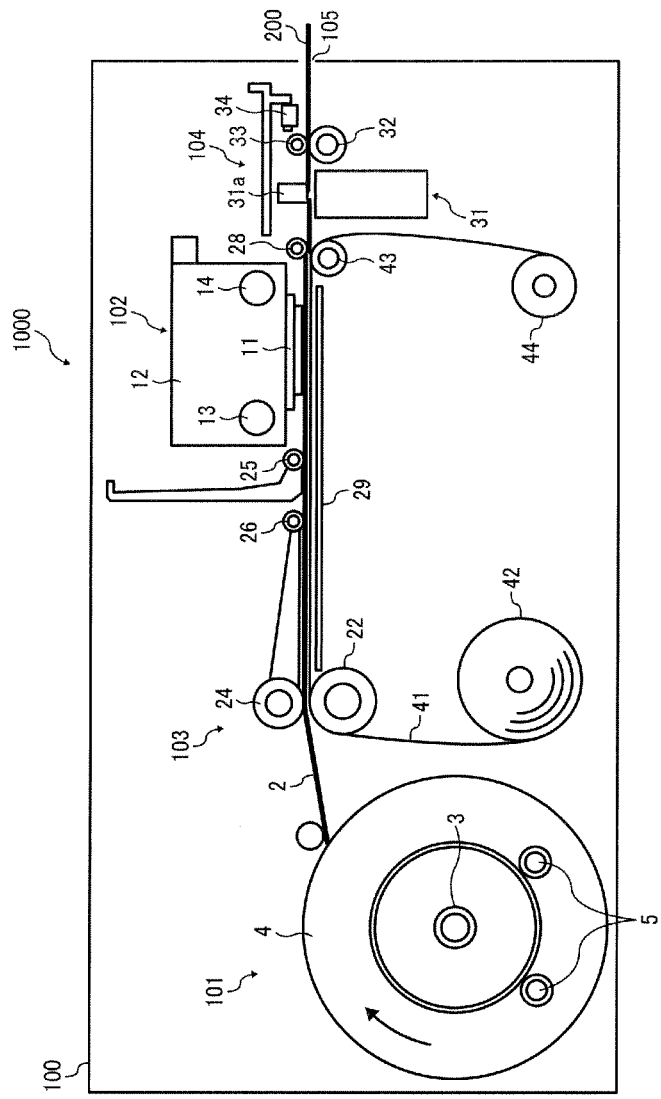
FIG. 1 is a side view of a configuration of an image forming apparatus according to a first exemplary embodiment of this disclosure.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION OF EXEMPLARY EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

For example, the term "image formation" used in this disclosure includes providing not only meaningful images, such as characters and figures, but meaningless images, such as patterns, to print media (in other words, the term "image formation" also includes causing liquid droplets to land on print media).

The term "ink" is not limited to "ink" in a narrow sense, unless specified, but is used as a generic term for any types of liquid usable as targets of image formation. For example, the term "ink" includes recording liquid, fixing solution, liquid, and so on.

The term "image forming apparatus", unless specified, also includes both serial-type image forming apparatus and line-type image forming apparatus.

Although the exemplary embodiments are described with technical limitations with reference to the attached drawings, such description is not intended to limit the scope of the invention and all of the components or elements described in the exemplary embodiments of this disclosure are not necessarily indispensable to the present invention.

Referring now to the drawings, wherein like reference numerals designate identical or corresponding parts throughout the several views, exemplary embodiments of the present disclosure are described below.

First, an image forming apparatus according to a first exemplary embodiment of this disclosure is described with reference to FIGS. 1, 2, and 3A and 3B.

Figure 2:
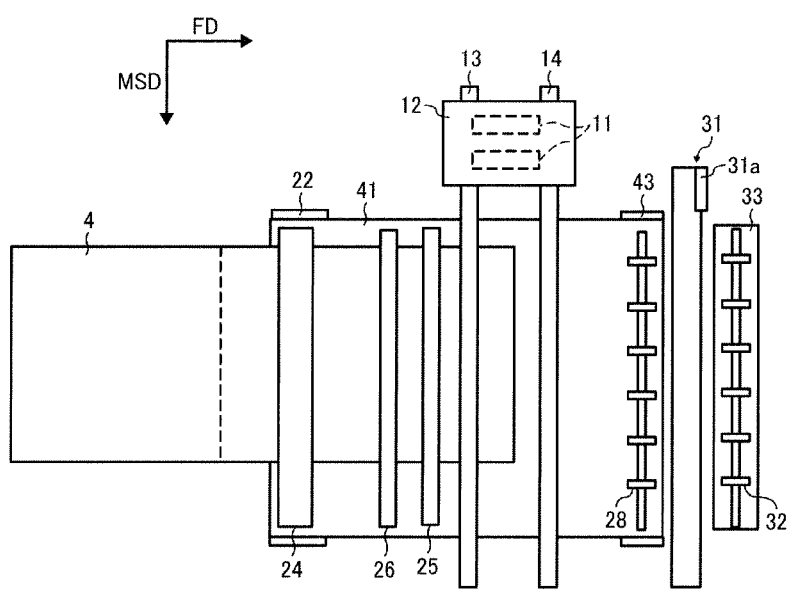
FIG. 2 is a plan view of the image forming apparatus of FIG. 1.
Figure 3A:
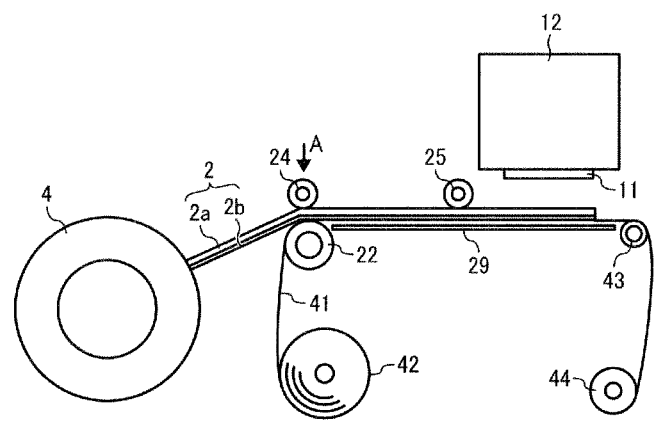
FIGS. 3A and 3B are partial side views of the image forming apparatus of FIG. 1.
Figure 3B:
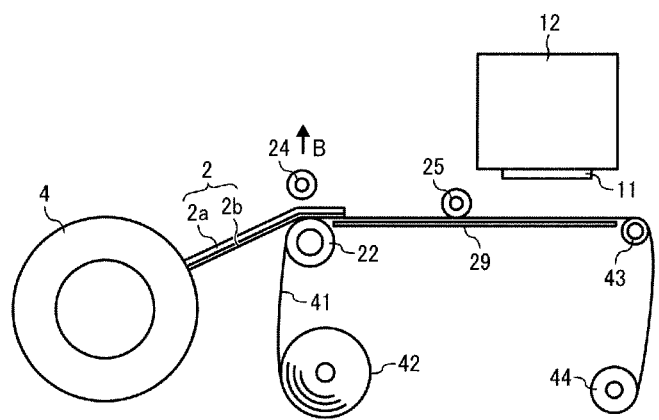

FIG. 1 is a side view of an entire configuration of an image forming apparatus 1000 according to a first exemplary embodiment of this disclosure. FIG. 2 is a plan view of the image forming apparatus 1000 of FIG. 1. FIGS. 3A and 3B are partial side views of the image forming apparatus 1000 of FIG. 1.

As illustrated in FIG. 1, the image forming apparatus 1000 has a feed unit 101, an image forming unit 102, a conveyance unit 103, and an output unit 104 within an apparatus body 100.

The feed unit 101 has a core member 3 and a media roll 4 formed of a print medium 2 rolled around the core member 3. The media roll 4 is rotatably supported by media-roll support members 5.

As illustrated in FIGS. 3A and 3B, the print medium 2 is a continuum having an image-formable medium (hereinafter, also referred to as "print face") 2a and an adhesive layer (hereinafter, also referred to as "adhesive face") 2b formed on a surface of the image-formable medium 2a. The print medium 2 is rolled around the core member 3 in a state in which a mount sheet (separation sheet or separator) is not adhered to the adhesive face 2b.

The image forming unit 102 serving as a recording unit or means includes at least one recording head 11 and a carriage 12. The recording head 11 is a liquid ejection head mounted on the carriage 12 to eject liquid droplets onto the print medium 2. The carriage 12 is supported by guide members 13 and 14 so as to be reciprocally movable along a direction perpendicular to a feed direction (also referred to as conveyance direction) of the print medium 2 indicated by an arrow FD in FIG. 2.

In this exemplary embodiment, the recording head 11 has, for example, two nozzle rows. The image forming apparatus 1000 has two recording heads 11 having four nozzle rows to eject ink droplets of, for example, black (K), cyan (C), magenta (M), and yellow (Y). It is to be noted that the configuration of the recording head is not limited to the above-described configuration but may be, for example, a line-type recording head.

The image forming unit 102 is not limited to the above-described type of liquid ejection head but may be any other type of image forming units (recording units) to form images on the print medium 2 in a contact or non-contact manner.

The conveyance unit 103 serving as conveyance means includes an adhesive-face protection member 41 to press against the adhesive face 2b of the print medium 2 to protect the adhesive face 2b of the print medium 2. The adhesive-face protection member 41 is an open-ended belt disposed below the recording heads 11.

The adhesive-face protection member 41 is wound around a reel-out roll 42. When the adhesive-face protection member 41 is drawn out from the reel-out roll 42, the adhesive-face protection member 41 is reeled around a reel roll 44 via a conveyance roller 22 serving as a rotor and a guide roller 43. In such a configuration, the reel roll 44 is rotated at a speed slightly higher than a rotation speed created by the conveyance roller 22 to apply tension to the adhesive-face protection member 41.

The adhesive-face protection member 41 has a length greater than a total length of the print medium 2 wound around the core member 3 as the media roll 4. After printing on the entire of the media roll 4 is finished, the adhesive-face protection member 41 is wound back around the reel-out roll 42 for reuse.

The adhesive-face protection member 41 may be replaced on regular basis in accordance with a type of the print medium 2. Alternatively, for example, when the print medium 2 has a relatively low adhesion and is unlikely to leave a residue of adhesive material of the adhesive face 2b on the adhesive-face protection member 41, the adhesive-face protection member 41 can be repeatedly reused without replacement during a product life of the image forming apparatus 1000.

By contrast, when the print medium 2 has a relatively high adhesion and is likely to leave a residue of adhesive material of the adhesive face 2b on the adhesive-face protection member 41, the adhesive-face protection member 41 may be replaced, for example, together with the reel-out roll 42 simultaneously with replacement of the media roll 4 of the print medium 2. Alternatively, as an intermediate way, the reel-out roll 42 may be replaced each time several rolls of the media roll 4 are used.

A first pressing roller 24 serving as a rotor is disposed opposing the conveyance roller 22. A rotor pair of the conveyance roller 22 and the first pressing roller 24 forms the conveyance unit 103 or conveyance means to convey the print medium 2 to an image forming region of the recording heads 11 while sandwiching the print medium 2 and the adhesive-face protection member 41 together.

A second pressing roller 25 is disposed downstream from the conveyance roller 22 and upstream from the image forming region of the recording heads 11 in the feed direction FD of the print medium 2 to press the print medium 2 against the adhesive-face protection member 41. An intermediate pressing roller 26 is disposed between the first pressing roller 24 and the second pressing roller 25. Spur rollers 28 are disposed opposing the guide roller 43.

The output unit 104 has a cutter unit 31 at a position downward from the recording heads 11 in the feed direction FD of the print medium 2. The cutter unit 31 includes a cutter 31a to cut the print medium 2 to a desired length to form a print medium piece (label piece) 200. The cutter unit 31 moves the cutter 31a along a main scanning direction indicated by an arrow MSD in FIG. 2 to cut the print medium 2 into the label piece 200.

Output rollers 32 are disposed downstream from the cutter unit 31 in the feed direction FD of the print medium 2. Spur rollers 33 and the output rollers 32 are disposed at opposite sides across the print medium 2 fed from the driven roller 23 and the spur rollers 28. A sensor 34 is disposed to detect whether the print medium 2 (label piece 200) is present between the output rollers 32 and the spur rollers 33.

For the image forming apparatus having such a configuration, when an image is formed on the print medium 2, the print medium 2 is drawn from the media roll 4 installed in the feed unit 101. Meanwhile, the first pressing roller 24 is retracted from the conveyance roller 22 as indicated by an arrow B in FIG. 3B.

The print medium 2 is passed through a nipping portion between the conveyance roller 22 and the first pressing roller 24, and the first pressing roller 24 is moved in a direction to press the print medium 2 and the adhesive-face protection member 41 against the conveyance roller 22 as indicated by an arrow A in FIG. 3A. As a result, the print medium 2 and the adhesive-face protection member 41 are sandwiched together between and by the conveyance roller 22 and the first pressing roller 24.

When the conveyance roller 22 is rotated, as illustrated in FIG. 3A, the print medium 2 is conveyed with the adhesive face 2b protected by the adhesive-face protection member 41, and a desired image is formed on the print medium 2 by the recording heads 11 of the image forming unit 102.

When the adhesive-face protection member 41 is separated form the print medium 2 having the image formed, the print medium 2 is conveyed to the output unit 104 and cut at a desired position by the cutter unit 31 to form a label piece 200. The label piece 200 is fed to an output port 105 of the apparatus body 100 through a nipping portion between the output rollers 32 and the spur rollers 33.

In other words, as an image forming method, the image forming apparatus 1000 performs a step of pressing, against the adhesive face 2b, the adhesive-face protection member 41 separable from the adhesive face 2b of the print medium 2, a step of conveying the print medium 2 and the adhesive-face protection member 41 while sandwiching the print medium 2 and the adhesive-face protection member 41 together, a step of forming an image on the print medium 2 conveyed, and a step of separating the adhesive-face protection member 41 from the adhesive face 2b of the print medium 2.

Here, the image forming apparatus 1000 has the following feature to convey a print medium having an adhesive face and form an image on the print medium.

In other words, using the adhesive-face protection member 41 separable from the adhesive face 2b of the print medium 2, the image forming apparatus 1000 conveys the print medium 2 and the adhesive-face protection member 41 together with the adhesive face 2b pressed against the adhesive-face protection member 41, to form an image on the print medium 2.

At this time, the adhesive-face protection member 41 preferably has no adhesion to the adhesive face 2b. However, to prevent the print medium 2 floating up from the adhesive-face protection member 41 during conveyance, the adhesive-face protection member 41 may be adhesive to the adhesive face 2b to an extent that the adhesive-face protection member 41 is separable from the adhesive face 2b. Pressing the adhesive-face protection member 41 against the adhesive face 2b allows protection of the adhesive face 2b and stable conveyance of the print medium 2. In addition, since the adhesive-face protection member 41 is separable from the adhesive face 2b, the print medium 2 separated from the adhesive-face protection member 41 is output from the output port 105.

In the above-described exemplary embodiment, image formation is performed on the print medium 2 with the print medium 2 and the adhesive-face protection member 41 sandwiched together. In some embodiments, with the adhesive face 2b protected with the adhesive-face protection member 41, the print medium 2 is conveyed to a position just upstream from the image forming unit 102 in the feed direction FD of the print medium 2. After the adhesive-face protection member 41 is separated from the adhesive face 2b, the image forming unit 102 forms an image on the print medium 2, and the print medium 2 is output.

In addition, conveying the print medium 2 and the adhesive-face protection member 41 with the print medium 2 and the adhesive-face protection member 41 sandwiched together provides sufficient conveyance force. When the adhesive-face protection member 41 is moved without pressing the print medium 2 and the adhesive-face protection member 41 by the first pressing roller 24, a relatively large resistance arises in drawing the print medium 2 from the media roll 4. As described above, since the adhesive-face protection member 41 has no or weak adhesion to the adhesive face 2*b*, little friction arises between the adhesive-face protection member 41 and the print medium 2, thus causing slippage of the print medium 2 on the adhesive-face protection member 41. As a result, the adhesive-face protection member 41 is separately moved while the print medium 2 is not conveyed.

Arrangement of the second pressing roller 25 at a position upstream from the image forming unit 102 and near the recording heads 11 prevents the print medium 2 from floating up from the adhesive-face protection member 41. As a result, the distance between the print medium 2 and the recording heads 11 can be maintained constant, thus preventing the print medium 2 from rubbing against the recording heads 11.

In such a case, the second pressing roller 25 is preferably disposed at a position just upstream from the image forming position of the recording heads 11 in the feed direction of the print medium 2. The second pressing roller 25 preferably presses an area corresponding to a width of the print medium 2. Such a configuration more securely prevents the print medium 2 from floating up at the image forming position of the recording heads 11.

Since the print medium 2 has a two-layer structure of an adhesive layer and a layer forming a print face, the print medium 2 is more likely to be curled than a plain sheet of paper, thus making stable conveyance difficult. The print medium 2 is curled upward or downward depending on materials of the adhesive layer and the layer forming the print face, and the force of curling the print medium 2 is not constant, thus making stable conveyance difficult.

Hence, for this exemplary embodiment, pressing the adhesive-face protection member 41 separable from the adhesive face 2*b* suppresses curling of the print medium 2. Adhesion of the adhesive-face protection member 41 to the adhesive face 2*b* of the print medium 2 is set to be such an adhesion that prevents the print medium 2 from floating up before printing and allows separation of the adhesive-face protection member 41 from the adhesive face 2*b* of the print medium 2.

In such a case, the adhesion between the print medium 2 having the adhesive face 2*b* and the adhesive-face protection member 41 is determined by a surface condition and a contact area of the adhesive-face protection member 41. Hence, processing (coating) the surface of the adhesive-face protection member 41 suppresses a change in the adhesion over time. Additionally, combining a material of the adhesive-face protection member 41 with a coating material allows adjustment of the adhesion.

In some embodiments, the adhesive-face protection member 41 has multiple holes. Such a configuration can reduce the contact area of the adhesive-face protection member 41 with the adhesive face 2*b* of the print medium 2. Adhesion between the print medium 2 having the adhesive face and the adhesive-face protection member 41 can be easily adjusted by adjusting the number and/or area of holes of the adhesive-face protection member 41.

By conveying the print medium 2 sandwiched between the conveyance roller 22 and the first pressing roller 24, a load for drawing the media roll 4 causes tension to act on the print medium 2 in an area from the media roll 4 to a position between the conveyance roller 22 and the first pressing roller 24, thus preventing a slack of the print medium 2. As a result, such a configuration allows stable conveyance of the print medium 2 having the adhesive face 2*b*, thus allowing stable image formation on the print medium 2 having the adhesive face 2*b*.

Next, a second exemplary embodiment of this disclosure is described with reference to FIG. 4.

Figure 4:
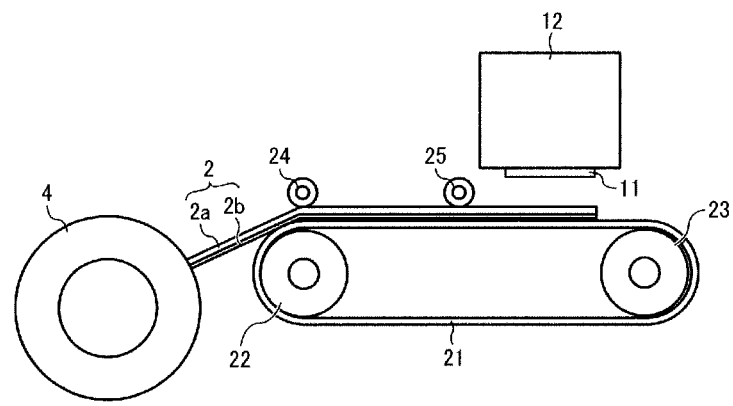
FIG. 4 is a side view of an image forming apparatus according to a second exemplary embodiment of this disclosure.

FIG. 4 is a side view of an image forming apparatus according to the second exemplary embodiment of this disclosure.

For this exemplary embodiment, as a member corresponding to the adhesive-face protection member 41 in the first exemplary embodiment, a protection belt 21 serving as an adhesive-face protection member to protect an adhesive face of a print medium 2 is disposed in an endless belt form. The protection belt 21 is looped around a conveyance roller 22 and a driven roller 23 so as to be circurable.

For such a configuration, the print medium 2 and the protection belt 21 are sandwiched together between the conveyance roller 22 and a first pressing roller 24. By rotating the conveyance roller 22, the print medium 2 is conveyed with an adhesive face 2*b* of the print medium 2 protected with the protection belt 21, and image formation is performed on the print medium 2.

In addition, for such a configuration, as with the configuration of the above-described first exemplary embodiment, the adhesion between the print medium 2 and the protection belt 21 can be adjusted by processing (coating) an outer surface of the protection belt 21 or adjusting a contact area by formation of holes, thus allowing conveyance of the print medium 2 while preventing the print medium 2 from floating up from the protection belt 21.

For this exemplary embodiment, as described above, the protection member has the above-described endless belt shape. Such a configuration obviates the adhesive-face protection member 41 (the reel-out roll 42) having a length corresponding to a total length of the print medium 2 rolled around the media roll 4 in the image forming apparatus, thus allowing downsizing of the image forming apparatus.

An area of the protection member in which adhesion to the adhesive face 2*b* is to be adjusted is limited to an area having an outer circumferential length of the protection belt 21. Such a configuration facilitates application of highly durable, even if high cost, non-adhesive processing, thus enhancing durability and reliability.

Such a configuration also obviates regular replacement of the adhesive-face protection member even when the print medium 2 is highly adhesive, i.e., likely to leave a residue of an adhesive material, thus resulting in a reduction of waste.

Next, a third exemplary embodiment of this disclosure is described with reference to FIG. 5.

Figure 5:
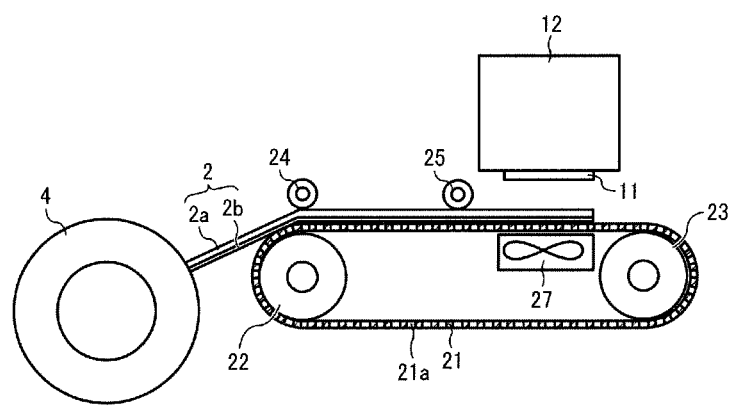
FIG. 5 is a side view of an image forming apparatus according to a third exemplary embodiment of this disclosure.

FIG. 5 is a side view of an image forming apparatus according to the third exemplary embodiment of this disclosure.

For this exemplary embodiment, a protection belt 21 has multiple holes 21*a*, for example, as illustrated in FIGS. 6A to 6D. Within a loop formed by the protection belt 21, a suction fan 27 is disposed opposing recording heads 11 of an image forming unit 102. The suction fan 27 sucks the print medium 2 toward a surface of the protection belt 21 via the holes 21*a*.

As described above, the print medium 2 having an adhesive face is more likely to be curled than a plain sheet of paper. The print medium 2 is curled upward or downward, and the curled direction of the print medium 2 is not constant. Hence, for this exemplary embodiment, the suction fan 27 serving as a sucking unit or means is disposed below an image forming region relative to the protection belt 21 having holes, thus more reliably preventing the print medium from floating up from the protection belt 21.

The holes 21*a* can have different shapes illustrated in, e.g., FIGS. 6A to 6D, and one shape is selected based on required attachment force and separability.

Figure 6A:
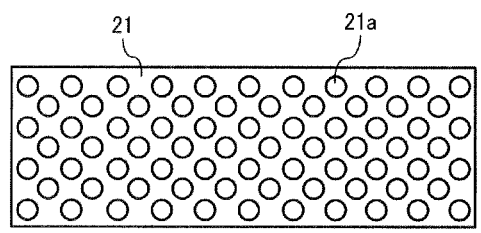
FIGS. 6A to 6D are plan views of different examples of a protection belt.
Figure 6B:
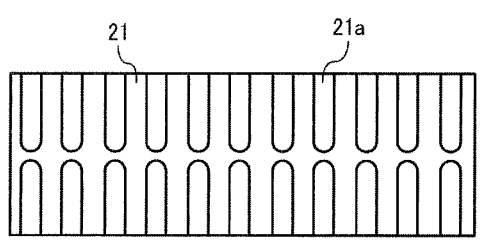
Figure 6C:
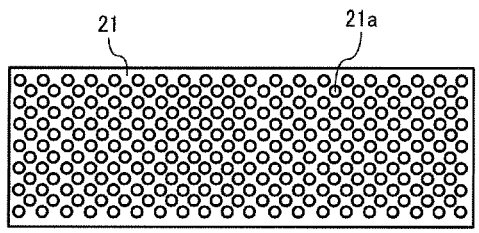
Figure 6D:
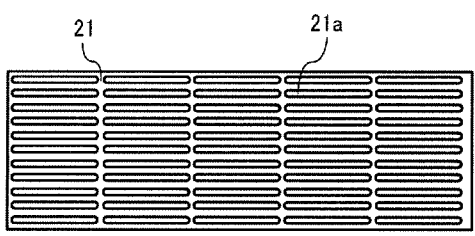

In some embodiments, when the protection belt 21 has a relatively great adhesion to the adhesive face 2*b*, long holes illustrated in, e.g., FIGS. 6B and 6D are preferably used in consideration of separability. In some embodiments, in particular, long holes illustrated in FIG. 6B are preferably used since there are few areas in which the holes are not formed across the whole range in a width direction of the print medium perpendicular to a conveyance direction of the print medium.

In some embodiments, when the protection belt 21 has little adhesion to the adhesive face 2b, round holes as illustrated in, e.g., FIGS. 6A and 6C are preferably used to enhance the attachment force. In such a case, the attachment force differs depending on the size of holes. Hence, in some embodiments, in positions corresponding to opposed end portions of the print medium 2 in a direction perpendicular to the conveyance direction of the print medium 2, the diameter of holes is set to be relatively large (as illustrated in FIG. 6A) to increase the attachment force. By contrast, in positions corresponding to a center portion of the print medium 2 in the direction perpendicular to the conveyance direction of the print medium 2, the diameter of holes is set to be relatively small (as illustrated in FIG. 6C) since the center portion of the print medium 2 is unlikely to float up. For such a configuration, a front end of the center portion of the print medium 2 is separated from the protection belt 21 earlier than the end portions of the print medium 2. As a result, separability can be enhanced without reducing the attachment force as compared to a case in which all holes have the shape illustrated in FIG. 6A.

Figure 7:
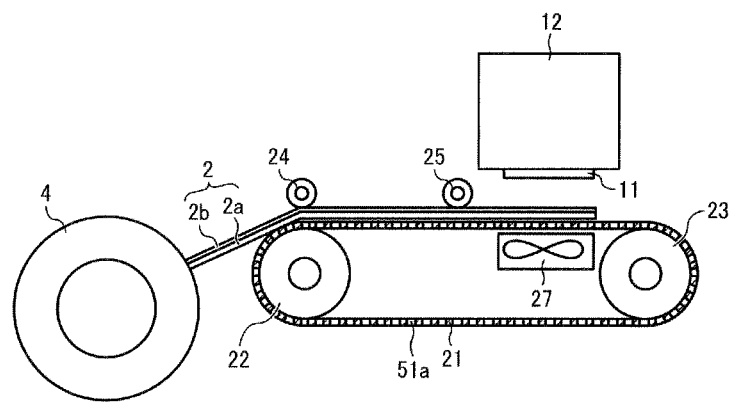
FIG. 7 is a side view of a variation of the image forming apparatus according to the third exemplary embodiment of this disclosure.

In addition, as described in this exemplary embodiment, providing the suction fan 27 allows even a face differing from the adhesive face 2b of the print medium 2 to be held on the protection belt 21. As a result, as illustrated in FIG. 7, a back side of the adhesive face 2b can be fixed on the protection belt 21, thus allowing an image to be formed on the adhesive face 2b of the print medium 2.

For such conveyance, since the first pressing roller 24 and the second pressing roller 25 contact the adhesive face 2b, the surfaces of the first pressing roller 24 and the second pressing roller 25 are coated with a non-adhesive material having no adhesion to the adhesive face 2b or a weak-adhesive material having an adhesion weaker than a suction force by which the suction fan 27 sucks the print medium 2.

Next, a fourth exemplary embodiment of this disclosure is described with reference to FIG. 8.

Figure 8:
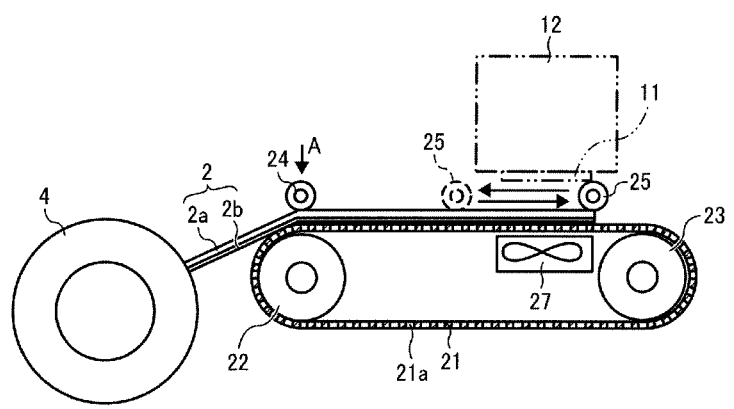
FIG. 8 is a side view of an image forming apparatus according to a fourth exemplary embodiment of this disclosure.

FIG. 8 is a side view of an image forming apparatus according to the fourth exemplary embodiment of this disclosure.

For this exemplary embodiment, a second pressing roller 25 serving as a pressing unit or means is disposed so as to be reciprocally movable between a first position indicated by a broken line and a second position indicated by a solid line in FIG. 8.

For such a configuration, operation is performed in the following procedure.

1) Recording heads 11 are retracted from a position above a protection belt 21 so that the second pressing roller 25 can operate. 2) A print medium 2 is conveyed to an image forming region in which the recording heads 11 form an image on the print medium 2. 3) The print medium 2 is moved from the first position indicated by the broken line to the second position indicated by the solid line in FIG. 8 while the second pressing roller 25 presses the print medium 2 against the protection belt 25. A front end portion of the print medium 2 is pressed against the protection belt 21 to prevent the print medium 2 from floating up from the protection belt 21. 4) The second pressing roller 25 is moved back from the second position to the first position. 5) The recording heads 11 start image formation.

Such operation reliably prevents floating of the front end portion of the print medium 25, thus maintaining a constant distance between the recording heads 11 and the print medium 2.

Next, a fifth exemplary embodiment of this disclosure is described with reference to FIGS. 9 and 10.

Figure 9:
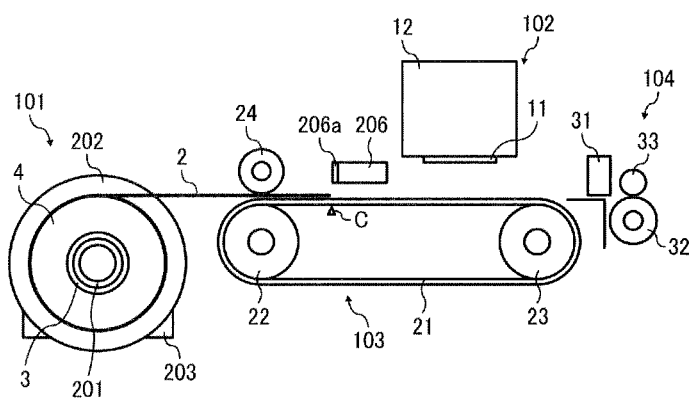
FIG. 9 is a side view of an image forming apparatus according to a fifth exemplary embodiment of this disclosure.
Figure 10:
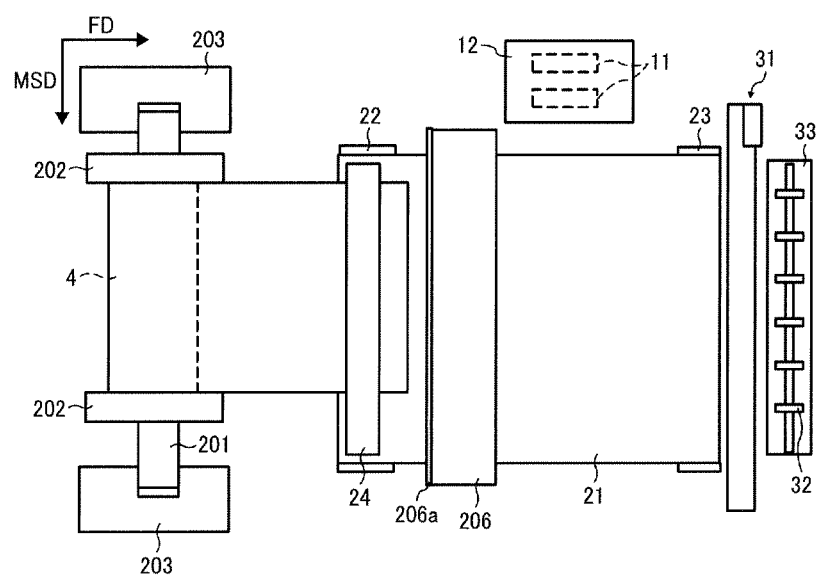
FIG. 10 is a plan view of the image forming apparatus of FIG. 9.

FIG. 9 is a side view of an image forming apparatus according to the fifth exemplary embodiment of this disclosure. FIG. 10 is a plan view of the image forming apparatus according to the fifth exemplary embodiment of this disclosure.

For this exemplary embodiment, a feed unit 101 includes a media-roll holder and a shaft holder 203. The media-roll holder includes a shaft member 201 and flange members 202. The shaft member 201 is fitted into a core member 3 of the media roll 4. The flange members 202 are engaged with opposed end portions of the shaft member 201 to protect side faces of the media roll 4. The shaft holder 203 rotatably holds the opposed end portions of the shaft member 201.

The shaft holder 203 has a detachment preventing member to prevent accidental detachment of the media roll 4 from the shaft member 201.

For this exemplary embodiment, an index member 206 is disposed between a first pressing roller 24 and an image forming unit 102 to define a front end position of the print medium 2 drawn from the media roll 4. The index member 206 extends in a direction (main scanning direction) perpendicular to a feed direction of the print medium 2, and is disposed away from the protection belt 21 by such a distance that the print medium 2 can be securely conveyed between the index member 206 and the protection belt 21.

An end face of the index member 206 at a side proximal to the first pressing roller 24 serves as an index 206a.

Next, a procedure of setting the print medium 2 onto the protection belt 21 in the fifth exemplary embodiment is described with reference to FIGS. 11A and 11B.

Figure 11A:
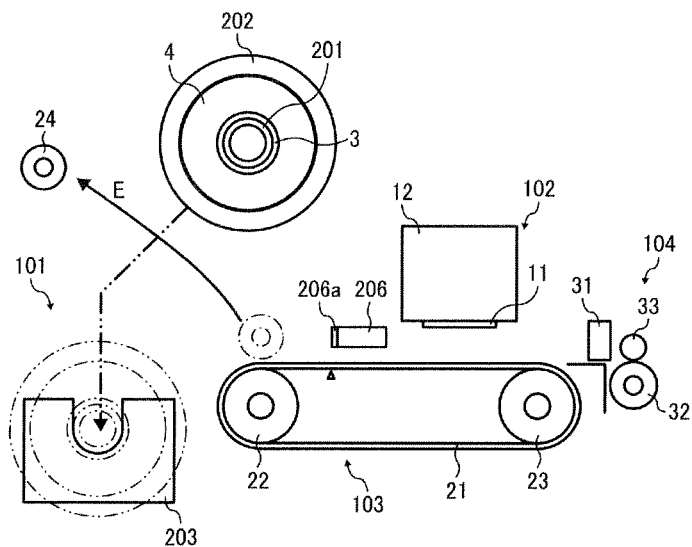
FIGS. 11A and 11B are side views of the image forming apparatus according to the fifth exemplary embodiment of this disclosure.
Figure 11B:
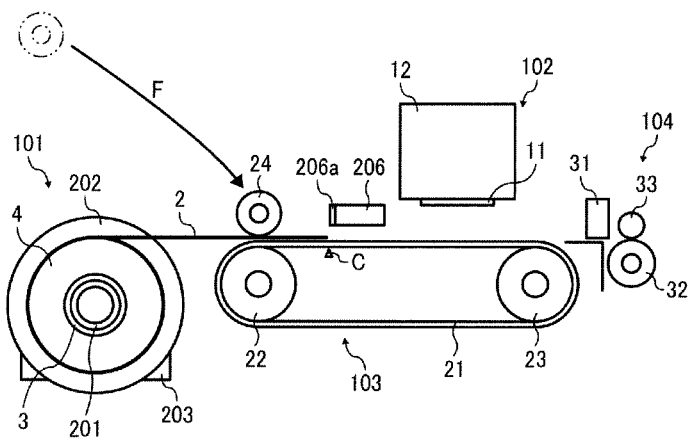

FIGS. 11A and 11B are side views of the image forming apparatus according to the fifth exemplary embodiment of this disclosure.

When the print medium 2 is set onto the protection belt 21, the first pressing roller 24 is moved in a direction indicated by an arrow E in FIG. 11A.

The first pressing member 24 is held by a structure flame of an apparatus body 100 together with members (except for elements of the image forming unit 102) disposed above the protection belt 21, such as a cover member to protect a surface or other portion of the protection belt 21. The first pressing roller 24 is movable and forms a cram shell structure in which the first pressing roller 24 is swingable around a fulcrum shaft.

With the media roll 4 held by the media-roll holder including the shaft member 201 and the flange members 202, the media roll 4 is installed to a recessed portion of the shaft holder 203, and the recessed portion of the shaft holder 203 is closed by the detachment preventing member.

As illustrated in FIG. 11B, the print medium 2 is drawn from the media roll 4, and a front end of the print medium 2 is aligned with the index 206a of the index member 206. Thus, the print medium 2 is set on the protection belt 21. In FIG. 11B, a setting position at which the front end of the print medium 2 is to be set on the protection belt 21 is indicated by a triangle C.

Then, the first pressing roller 24 is moved to a position opposing the conveyance roller 22 in a direction indicated by an arrow F in FIG. 11B, and the print medium 2 and the protection belt 21 are sandwiched between and pressed by the first pressing roller 24 and the conveyance roller 22.

As described above, providing the index member 206 indicating the setting position at which the print medium 2 drawn from the media roll 4 is to be set on the protection belt 21 allows the print medium 2 to be set on a proper position on the protection belt 21.

For example, if the amount of the print medium 2 drawn from the media roll 4 is too large, a relatively large portion of the print medium 2 once drawn from the media roll would be rewound, thus resulting in a reduced adhesion of an adhesive face 2b of the print medium 2. By contrast, if the amount of the print medium 2 drawn from the media roll 4 is too small, the print medium 2 would not be conveyed to a position at which the print medium 2 is pressed by the first pressing roller 24, and as a result, the print medium 2 would not be conveyed to the image forming unit 102.

Providing the index member 206 allows the print medium 2 to be drawn from the media roll 4 without excess or deficiency so that the front end of the print medium 2 is aligned with the index 206a.

The adhesive face 2b of the print medium 2 can have substantially no force against an outer surface of the non-adhesive protection belt 21 with respect to a separation direction (vertical direction relative to the protection belt 21). By contrast, because of the tackiness of the adhesive face 2b, the print medium 2 does not move in a friction direction (lateral direction or slide direction) unless a relatively large force is applied to the print medium 2. As a result, if a first setting position of the front end of the print medium 2 is slightly tilted relative to the conveyance direction of the print medium 2, the print medium 2 might not slide over the protection belt 21, thus resulting in cockling or a conveyance jam without being properly recovered. Hence, for this exemplary embodiment, the index member 206 is provided to set the print medium 2 to a constant position, thus allowing even the print medium 2 having the adhesive face 2b (unslidable on the protection belt 21) to be stably conveyed together with the protection belt 21. As a result, such a configuration allows stable image formation on the print medium 2 having the adhesive face 2b.

Next, a sixth exemplary embodiment of this disclosure is described with reference to FIG. 12.

Figure 12:
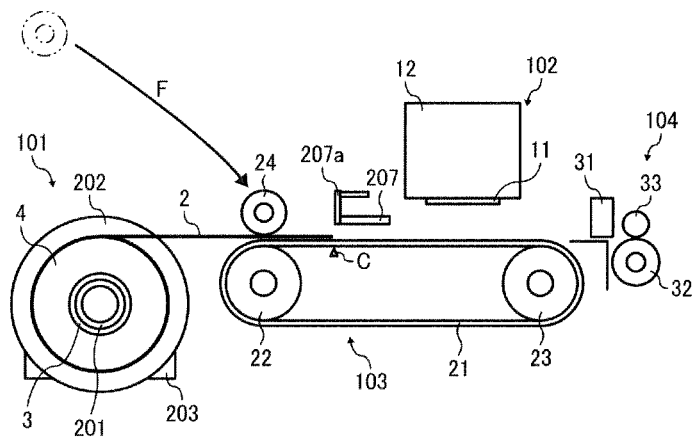
FIG. 12 is a side view of an image forming apparatus according to a sixth exemplary embodiment of this disclosure.

FIG. 12 is a side view of an image forming apparatus according to the sixth exemplary embodiment of this disclosure.

For this exemplary embodiment, an index member 207 has a cutting portion 207a to cut a print medium 2, and the cutting portion 207a is disposed at an end face of the index member 207 at an upstream side of the index member 207 in a conveyance direction of the print medium 2.

For example, when an operator draws the print medium 2 from a media roll 4, the operator may grip a front end portion of the print medium 2, thus resulting in a reduced adhesion of the front end portion. The above-described configuration allows removal of such a front end portion of the print medium 2 having a reduced adhesion.

As a result, the print medium 2 can be used from image formation without reducing the quality of adhesion.

Here, a procedure of operation in this sixth exemplary embodiment t is described below.

First, the print medium 2 is drawn from the media roll 4 to a downstream side of the index member 207 in the conveyance direction of the print medium 2, and a drawing direction of the print medium 2 is aligned in parallel to the conveyance direction of the print medium 2 by referring to an index of the index member 207. Then, as illustrated in FIG. 12, a first pressing member 24 is moved to a position opposing a conveyance member 22 in a direction indicated by an arrow F in FIG. 12. The print medium 2 and the protection belt 21 are sandwiched between and pressed by the first pressing roller 24 and the conveyance roller 22.

After the positions of the print medium 2 and the protection belt 21 are fixed, the cutting portion 207a is moved to cut the front end portion of the print medium 2.

Thus, a position of the front end perpendicular to the conveyance direction is determined at a constant position relative to the index member 207. Meanwhile, as described above, a portion of the print medium 2 gripped by an operator drawing the print medium 2 from the media roll 4 is cut by the cutting portion 207a and discarded.

The front end portion of the print medium 2 may float up from the protection belt 21 30 just after cut by the cutting portion 207a. Hence, in some embodiments, the conveyance roller 22 and the first pressing roller 24 are reversely rotated in a direction opposite the conveyance direction of the print medium 2 to press the front end portion once and feed the front end portion in the conveyance direction to a position prior to the reverse rotation.

Next, a seventh exemplary embodiment of this disclosure is described with reference to FIG. 13.

Figure 13:
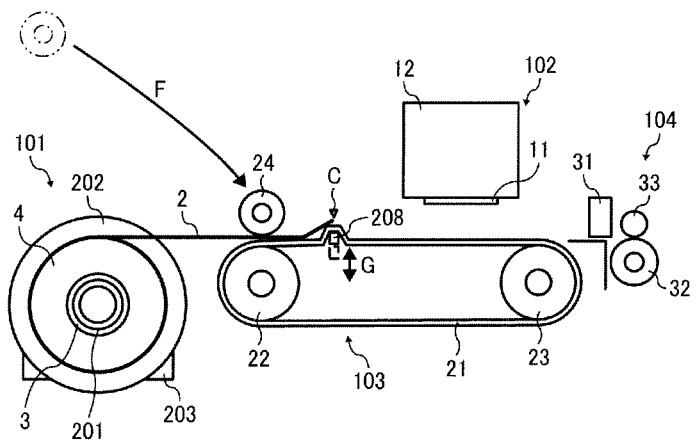
FIG. 13 is a side view of an image forming apparatus according to a seventh exemplary embodiment of this disclosure.

FIG. 13 is a side view of an image forming apparatus according to the seventh exemplary embodiment of this disclosure.

For this exemplary embodiment, an index assist member 208 is disposed at an inner surface side of a loop of a protection belt 21 to assist an index. The index assist member 208 is disposed so as to be movable upward and downward (back and forth) in a direction indicated by an arrow G between a first position indicated by a solid line and a second position indicated by a broken line. At the first position, the index assist member 208 contacts the protection belt 21 to lift up a portion of the protection belt 21 in a convex shape (and lift up the portion entirely or intermittently in the main scanning direction). At the second position, the index assist member 208 does not prevent movement of the protection belt 21 (i.e., is placed at a position away from the protection belt 21 or at such a position that, even if the index assist member 208 contacts the protection belt 21, the protection belt 21 is maintained in a horizontal state on the index assist member 208.

For such a configuration, when a print medium 2 is drawn from a media roll 4 and set onto the protection belt 21, the index assist member 208 is moved to the first position indicated by the solid line in FIG. 13 to form the convex portion in the protection belt 21. Since the convex portion serves as an index 209, the print medium 2 can be set to a proper position on the protection belt 21.

In some embodiments, the index assist member 208 is intermittently formed in the main scanning direction. Such a configuration allows the front end of the print medium 2 to be aligned along the index assist member 208, and the print medium 2 to be aligned in a direction perpendicular to the conveyance direction of the print medium 2.

Next, an eighth exemplary embodiment of this disclosure is described with reference to FIG. 14.

Figure 14:
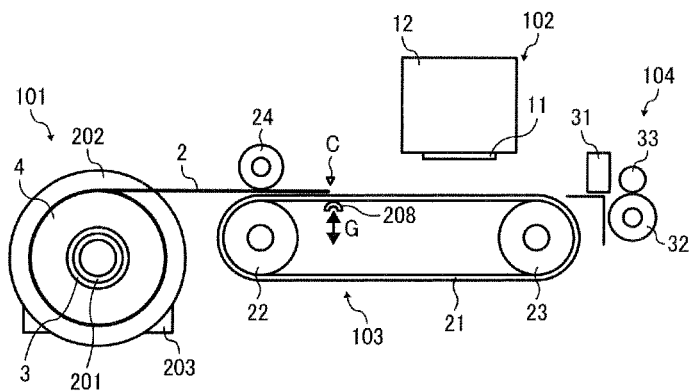
FIG. 14 is a side view of an image forming apparatus according to an eighth exemplary embodiment of this disclosure.

FIG. 14 is a side view of an image forming apparatus according to the eighth exemplary embodiment of this disclosure.

For this exemplary embodiment, an index assist member 208 has a contact face to contact a protection belt 21, and the contact face has a half-round or half-cylindrical shape in a cross section of the index assist member 208.

In addition to the operation effects of the above-described seventh exemplary embodiment, such a configuration allows smooth circulation of the protection belt 21 since, even when the index assist member 208 contacts the inner surface of the loop of the protection belt 21, no corner on which stress is likely to concentrate arises in the protection belt 21.

Next, a ninth exemplary embodiment of this disclosure is described with reference to FIG. 15.

Figure 15:
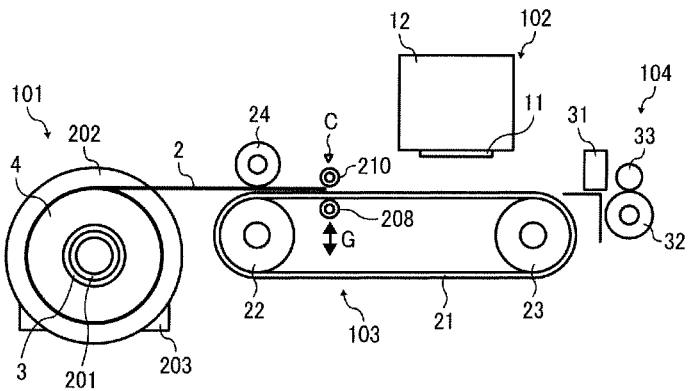
FIG. 15 is a side view of an image forming apparatus according to a ninth exemplary embodiment of this disclosure.

FIG. 15 is a side view of an image forming apparatus according to the ninth exemplary embodiment of this disclosure.

For this exemplary embodiment, an index assist member 208 is a cylindrical member rotatably disposed at an inner surface side of a loop of a protection belt 21.

Such a configuration significantly reduces a friction load caused by a contact of the index assist member 208 with the inner surface of the protection belt 21, thus allowing smooth circulation of the protection belt 21.

Additionally, a roller member 210 is rotatably disposed opposing the index assist member 208 across the protection belt 21 to press a print medium 2 toward the protection belt 21. The roller member 210 is mounted to a cram-shell structure together with a first pressing roller 24 so as to contact (approach to a position adjacent to) and move away from the outer surface of the protection belt 21.

As described above, in setting the print medium 2, an operator may grip an adhesive face of a front end portion of the print medium 2, thus resulting in a reduced adhesion of the front end portion. The above-described configuration allows the front end portion to be pressed onto the protection belt 21, thus preventing the print medium 2 from floating up from the protection belt 21.

Next, a tenth exemplary embodiment of this disclosure is described with reference to FIG. 16.

Figure 16:
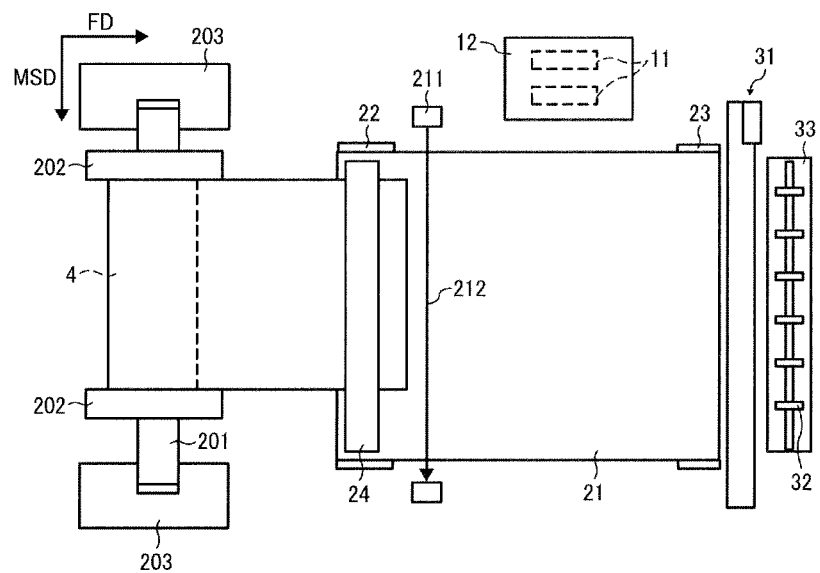
FIG. 16 is a plan view of an image forming apparatus according to a tenth exemplary embodiment of this disclosure.

FIG. 16 is a side view of an image forming apparatus according to the tenth exemplary embodiment of this disclosure.

For this exemplary embodiment, at one end side in a main scanning direction, the image forming apparatus has a light emitter 211 to emit a light 212, e.g., a laser light, as an index crossing a protection belt 21 in the main scanning direction.

Such a configuration allows a front end of the print medium 2 to be set to a proper position on the protection belt 21. Use of the light 212 as the index allows formation of a position index for the front end of the print medium without reducing an operation space when an operator sets the print medium 2.

Next, an eleventh exemplary embodiment of this disclosure is described with reference to FIG. 17.

Figure 17:
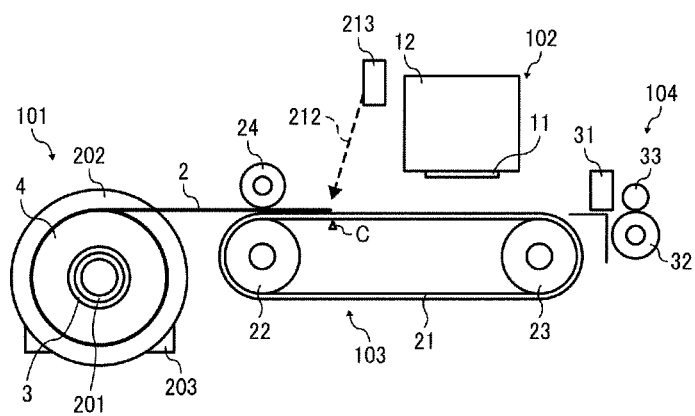
FIG. 17 is a side view of an image forming apparatus according to an eleventh exemplary embodiment of this disclosure.

FIG. 17 is a side view of an image forming apparatus according to the eleventh exemplary embodiment of this disclosure.

For this exemplary embodiment, a light emitter 213 to emit a light 212 onto a protection belt 21 is disposed above the protection belt 21.

For such a configuration, indicating a setting position of the print medium 2 by the light 212 allows a front end of the print medium 2 to be set to a proper position on the protection belt 21. Use of the light 212 as an index allows formation of a position index for the front end of the print medium 2 without reducing an operation space when an operator sets the print medium 2.

Next, a twelfth exemplary embodiment of this disclosure is described with reference to FIG. 18.

Figure 18:
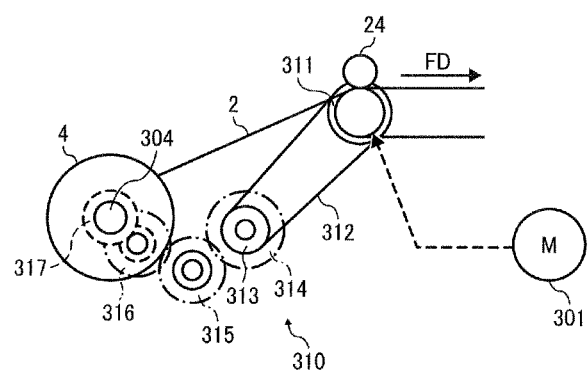
FIG. 18 is a side view of a driving system of a feed unit and a conveyance unit according to a twelfth exemplary embodiment of this disclosure.

FIG. 18 is a side view of a driving system of a feed unit and a conveyance unit according to the twelfth exemplary embodiment of this disclosure.

A conveyance roller 22 is rotated by a driving motor 301 via a drive transmission assembly. Rotation of the driving motor 301 is transmitted via a drive transmission assembly 310 to a rotary shaft 304 holding a core member 3 of a media roll 4. The core member 3 of the media roll 4 and the rotary shaft 304 are joined by, e.g., a spline so as to simultaneously rotate.

The drive transmission assembly 310 includes, for example, a pulley 311, a timing belt 312, a pulley 313, a gear 314, a gear 315, a gear 316, and a torque limiter 317. The pulley 311 is coaxially mounted on a rotary shaft of the conveyance roller 22. The timing belt 312 is looped around the pulley 311 and the pulley 313. The gear 31 and the pulley 313 are coaxially mounted on a single shaft. The gear 315 engages the gear 314, and the gear 316 engages the gear 315. The torque limiter 317 is mounted on the rotary shall 304. In some embodiments, instead of such a gear train, a belt transmission assembly is used in the drive transmission assembly 310.

The drive transmission assembly 310 is set to a deceleration ratio by adjusting a pulley ratio or a gear ratio so that a rotational peripheral velocity Va of the media roll 4 and a rotational peripheral velocity Vb of the conveyance roller 22 satisfy a relationship of Va The torque limiter 317 brakes rotation of the media roll 4 when the rotational peripheral velocity Va of the media roll 4 is equal to or greater than the rotational peripheral velocity Vb of the conveyance roller 22 (Va≥Vb).

Such a configuration maintains the peripheral velocity Va of the media roll 4 to be not greater than the peripheral velocity Vb. In other words, the rotation speed of the media roll 4 is maintained to be not higher than the rotation speed of the conveyance roller 22 (the feed speed of the print medium 2). In such a configuration, use of the torque limiter 317 suppresses influence of the moment of inertia occurring in accelerating and decelerating the print medium 2 intermittently driven when image formation is performed on the print medium 2.

Such a configuration prevents a slack of the print medium 2 in an area from the media roll 4 to the conveyance roller 22, thus allowing stable conveyance.

In other words, if a portion of the print medium 2 having an adhesive face 2b slacks at a position upstream from a position at which an adhesive-face protection member 41 contacts the adhesive face 2b, the adhesive face 2b of the slack portion might adhere to an interior of the image forming apparatus, thus making it difficult to resume conveying the print medium 2. Alternatively, even if a slack of the print medium 2 is not so large as to adhere to the interior of the image forming apparatus, a slight slack in the print medium 2 may cause re-adherence of the print medium 2 to the media roll 4, thus causing a change in the thickness or adhesion of an adhesive material of the adhesive face 2b. Hence, employing the above-described configuration according to this exemplary embodiment prevents such a change in the thickness or adhesion of an adhesive material of the adhesive face 2b, thus allowing stable conveyance and image formation on the print medium 2 having the adhesive face 2b.

Next, a thirteenth exemplary embodiment of this disclosure is described with reference to FIG. 19.

Figure 19:
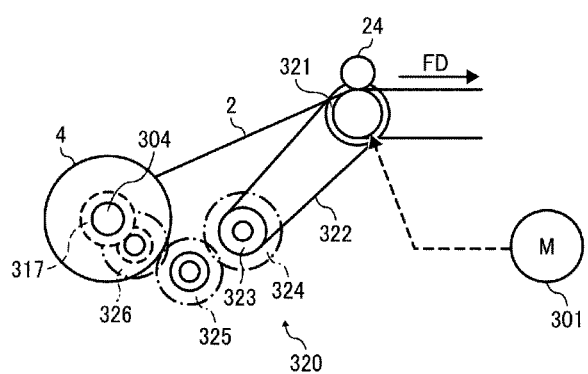
FIG. 19 is a side view of a driving system of a feed unit and a conveyance unit according to a thirteenth exemplary embodiment of this disclosure.

FIG. 19 is a side view of a driving system of a feed unit and a conveyance unit according to the thirteenth exemplary embodiment of this disclosure.

As with the drive transmission assembly 310 in the above-described twelfth exemplary embodiment, a drive transmission assembly 320 in this exemplary embodiment includes, for example, a pulley 321, a timing belt 322, a pulley 323, a gear 324, a gear 325, a gear 326, and a torque limiter 317. The pulley 321 is coaxially mounted on a rotary shaft of a conveyance roller 22. The timing belt 322 is looped around the pulley 321 and the pulley 323. The gear 324 and the pulley 323 are coaxially mounted on a single shaft. The gear 325 engages the gear 324, and the gear 326 engages the gear 325. The torque limiter 317 is mounted on a rotary shaft 304.

The drive transmission assembly 320 is set to a deceleration ratio (acceleration ratio) by setting a pulley ratio or a gear ratio differing from that of the drive transmission assembly 310 so that a rotational peripheral velocity Va of a media roll 4 and a rotational peripheral velocity Vb of the conveyance roller 22 satisfy a relationship of Va≥Vb.

For such a configuration, when a print medium 2 drawn from the media roll 4 is conveyed by the conveyance roller 22 (in normal rotation), a brake torque is applied to the rotary shaft 304 of the media roll 4 by the torque limiter 317. As a result, regardless of the usage amount (conveyance amount) of the print medium 2, stable tension is applied to the print medium 2 in an area from the media roll 4 to the conveyance roller 22.

Alternatively, when the print medium 2 drawn from the media roll 4 is rewound (in reverse rotation), the peripheral velocity Va of the media roll 4 and the peripheral velocity Vb of the conveyance roller 22 have a relationship of Va≥Vb. As a result, constant tension is applied to the print medium 2 in the area from the media roll 4 to the conveyance roller 22.

When a torque of the media roll 4 exceeds an allowable torque of the torque limiter 317, brake torque acts on the media roll 4. The print medium 2 drawn from the media roll 4 is rewound to the media roll 4, thus increasing the diameter of the media roll 4. As a result, the difference between the peripheral velocity Va of the media roll 4 and the peripheral velocity Vb of the conveyance roller 22 increases, thus preventing excessive tension from being applied to the print medium 2.

Next, a fourteenth exemplary embodiment of this disclosure is described with reference to FIG. 20.

Figure 20:
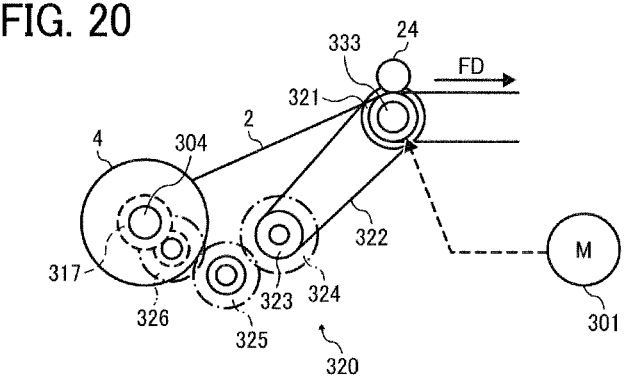
FIG. 20 is a side view of a driving system of a feed unit and a conveyance unit according to a fourteenth exemplary embodiment of this disclosure.

FIG. 20 is a side view of a driving system of a feed unit and a conveyance unit according to the fourteenth exemplary embodiment of this disclosure.

For this exemplary embodiment, in the drive transmission assembly 320 in the above-described thirteenth exemplary embodiment, a one-way clutch 333 is disposed between a shaft of the conveyance roller 22 and the pulley 321. When the print medium 2 is conveyed in a direction indicated by an arrow FD in FIG. 20 (in normal rotation), the one-way clutch 333 is set to an idle state.

Even if the relationship between the peripheral velocity Va and the peripheral velocity Vb is temporarily changed to Va<Vb by an external disturbance, such a configuration can block drive transmission to the media roll 4, thus preventing excessive tension from being applied to the print medium 2 in the area from the media roll 4 to the conveyance roller 22.

Next, a fifteenth exemplary embodiment of this disclosure is described with reference to FIG. 21.

Figure 21:
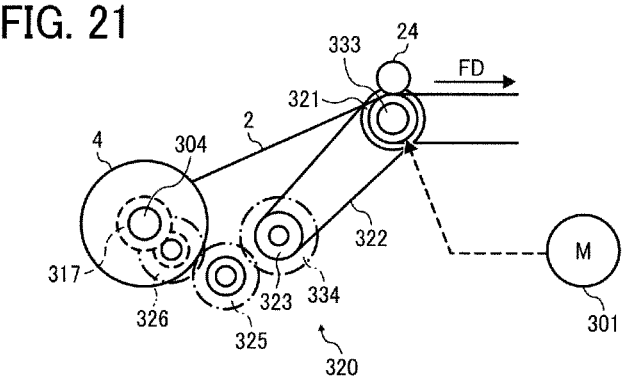
FIG. 21 is a side view of a driving system of a feed unit and a conveyance unit according to a fifteenth exemplary embodiment of this disclosure.

FIG. 21 is a side view of a driving system of a feed unit and a conveyance unit according to the fifteenth exemplary embodiment of this disclosure.

For this exemplary embodiment, in the drive transmission assembly 320 in the above-described fourteenth exemplary embodiment, a drive switching clutch 334 is provided to switch drive transmission between a transmission state and a block state when a print medium 2 is rewound to a media roll 4 at given timing (in reverse rotation). In this exemplary embodiment, the drive switching clutch 334 is disposed between the pulley 323 and the gear 325.

For such a configuration, when the print medium 2 is drawn from the media roll 4 and set onto an adhesive-face protection member, the drive switching clutch 334 is switched to the block state to shut off the drive transmission assembly 320, thus turning the rotary shaft 304 into an idle state (free state).

Such a configuration reduces the load in drawing the print medium 2 from the media roll 4, thus enhancing operability in the setting operation of the print medium 2.

Next, a sixteenth exemplary embodiment of this disclosure is described with reference to FIG. 22.

Figure 22:
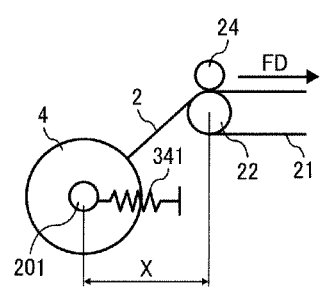
FIG. 22 is a schematic view of a feed unit and a conveyance unit according to a sixteenth exemplary embodiment of this disclosure.

FIG. 22 is a schematic view of a feed unit and a conveyance unit according to the sixteenth exemplary embodiment of this disclosure.

For this exemplary embodiment, a feed unit 101 has the same configuration as that of the above-described fifth exemplary embodiment (see FIG. 9). The feed unit 101 has an elastic load applicator 341, e.g., a spring, to apply elastic load to a shaft member 201 in a direction away from a conveyance roller 22. The shaft member 201 holds a core member 3 of a media roll 4.

Such a configuration applies tension to the media roll 4, thus causing tension to constantly act on a print medium 2 in an area from the media roll 4 to the conveyance roller 22 in an area between the media roll 4 and the conveyance roller 22. As described above, the moment of inertia of the media roll 4 occurs in acceleration and deceleration involved with intermittent feed operation performed when an image is formed on the print medium 2. For the configuration of this exemplary embodiment, the moment of inertia prevents a slack of the print medium 2 in the area between the media roll 4 and the conveyance roller 22.

Next, a seventeenth exemplary embodiment of this disclosure is described with reference to FIG. 23.

Figure 23:
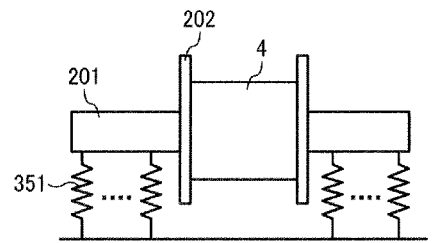
FIG. 23 is a schematic view of a feed unit according to a seventeenth exemplary embodiment of this disclosure.

FIG. 23 is a schematic view of a feed unit in the seventeenth exemplary embodiment.

For this exemplary embodiment, a feed unit 101 has the same configuration as that of the above-described fifth exemplary embodiment (see FIG. 9). The feed unit 101 has multiple elastic members 351 to support a shaft member 201 holding a core member 3 of a media roll 4.

For such a configuration, when a slack skewed in a width direction of a print medium 2 occurs in such a manner that the print medium 2 drawn from the media roll 4 twists in an area between the media roll 4 and a conveyance roller 22, an elastic member 351, e.g., a spring disposed in the width direction (main scanning direction) of the media roll 4 pushes a shaft member 201 of the media roll 4 toward a side having a relatively large slack, e.g., a rear side relative to a shaft of the conveyance roller 22. Thus, the parallelity between the shaft member 201 of the media roll 4 and the conveyance roller 22 is intentionally disturbed to correct the slack due to twist.

Such a configuration prevents cockling or other failures resulting in conveyance jam and caused by a slack of the print medium 2 conveyed to an area downstream from a nipping portion between the conveyance roller 22 and the first pressing roller 24.

Next, an eighteenth exemplary embodiment of this disclosure is described with reference to FIG. 24.

Figure 24:
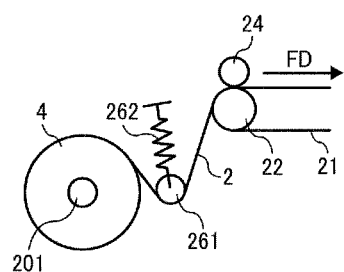
FIG. 24 is a schematic view of a feed unit according to an eighteenth exemplary embodiment of this disclosure.

FIG. 24 is a schematic view of a feed unit in the eighteenth exemplary embodiment.

For this exemplary embodiment, a tension applicator 261 is disposed between a media roll 4 and a conveyance roller 22 and pressed (urged) by an elastic member 262. The tension applicator 26 t is formed of, e.g., a roller.

As described above, tension is applied to a print medium 2 between the media roll 4 and the conveyance roller 22, thus preventing a slack of the print medium 2. Such a configuration also gives an effect of correcting a skewed slack caused by a twist of the print medium 2.

Next, a nineteenth exemplary embodiment of this disclosure is described with reference to FIG. 25.

Figure 25:
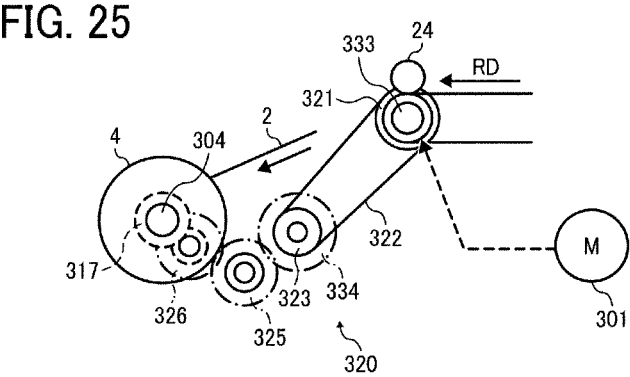
FIG. 25 is a schematic view of a feed and conveyance assembly according to a nineteenth exemplary embodiment of this disclosure.

FIG. 25 is a schematic view of a feed and conveyance assembly according to the nineteenth exemplary embodiment of this disclosure.

For this exemplary embodiment, when an image forming apparatus is stopped for a threshold period of time or more, a print medium 2 is rewound to a media roll 4 in a direction indicated by an arrow RD in FIG. 25. At this time, the print medium 2 is drawn back until the print medium 2 passes through a nipping portion between a conveyance roller 22 and a first pressing roller 24.

Such a configuration prevents an adhesive face of the print medium 2 from contacting a protection belt 21 over a long period of time and adhering to the protection belt 21, thus preventing a long-term adherence of such an adhesive material from reducing the non-adhesiveness or low adhesiveness of a surface of the protection belt 21.

Numerous additional modifications and variations are possible in light of the above teachings. It is therefore to be understood that, within the scope of the appended claims, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An image forming apparatus, comprising:
   a recording unit to form an image on a print medium having an adhesive face;
   a conveyance unit to convey the print medium;
   a protection member to press against the adhesive face of the print medium to protect the adhesive face; and
   at least one rotor pair, each including rotors to sandwich and press the print medium and the protection member therebetween,
   wherein the conveyance unit is configured to rotate the at least one rotor pair to convey the print medium and the protection member together to an image forming position at which the recording unit is configured to form the image on the print medium, and
   the protection member is configured to separate from the adhesive face of the print medium before discharge of the print medium to an outside of the image forming apparatus.

2. The image forming apparatus of claim 1, wherein one rotor of each of the at least one rotor pair is movable back and forth relative to the other rotor of the each of the at least one rotor pair.

3. The image forming apparatus of claim 1, further comprising a pressing member to press the print medium toward the protection member,
   wherein the pressing unit is disposed upstream from the recording unit in a conveyance direction of the print medium in which the print medium is conveyed by the conveyance unit.

4. The image forming apparatus of claim 3, wherein the pressing member is movable in the conveyance direction of the print medium.

5. The image forming apparatus of claim 1, further comprising a driven roller,
   wherein the pressing member is a belt looped around the driven roller and one of the at least one rotor pair.

6. The image forming apparatus of claim 5, further comprising a sucking unit to suck air,
   wherein the pressing member has holes and the sucking unit is configured to suck air through the holes.

7. The image forming apparatus of claim 1, further comprising:
   a core member;
   a media roll formed of the print medium rolled around the core member; and
   an index member to indicate a position of the print medium to be set on the protection member when the print medium is drawn from the media roll.

8. The image forming apparatus of claim 1, further comprising:
   a media roll formed of the print medium rolled; and
   a tension applicator to apply tension to the print medium in an area from the media roll to the at least one rotor pair to hold the print medium taut during both conveyance of the print medium and rewinding of the print medium.

9. An image forming apparatus, comprising:
   recording means for forming an image on a print medium having an adhesive face;
   conveyance means for conveying the print medium;
   a protection member to press against the adhesive face of the print medium to protect the adhesive face; and
   at least one rotor pair, each including rotors to sandwich and press the print medium and the protection member therebetween,
   wherein the conveyance means rotates the at least one rotor pair to convey the print medium and the protection member together to an image forming position at which the recording means forms the image on the print medium, and
   the protection member is configured to separate from the adhesive face of the print medium before discharge of the print medium to an outside of the image forming apparatus.

10. A method of forming an image on a print medium having an adhesive face, the method comprising:
    pressing a protection member against the adhesive face, the protection member being separable from the adhesive face;
    conveying the print medium and the protection member together while sandwiching the print medium and the protection member;
    forming an image on the print medium conveyed by the conveying; and
    separating the print medium from the protection member.

* * * * *